United States Patent Office 3,219,412
Patented Nov. 23, 1965

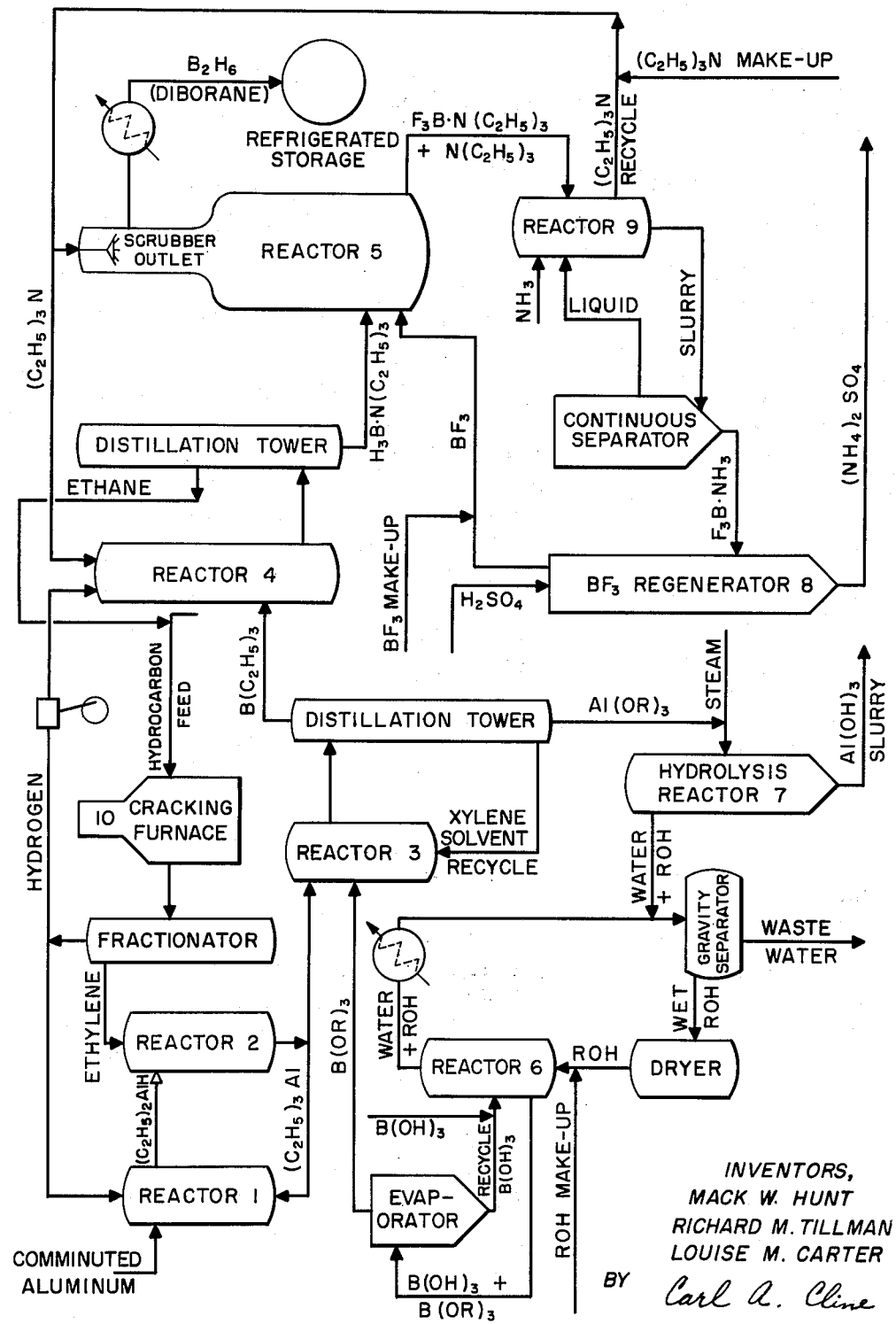

3,219,412
MANUFACTURE OF DIBORANE
Mack W. Hunt, Louise M. Carter, and Richard M. Tillman, all of Ponca City, Okla., assignors to Continental Oil Company, Ponca City, Okla., a corporation of Delaware
Filed May 15, 1961, Ser. No. 110,180
14 Claims. (Cl. 23—204)

The present invention is related to a process for manufacture of diborane. More particularly, this invention is an economical process for manufacture of diborane from low priced and readily available raw materials.

Diborane is useful as a precursor to high-energy fuel, particularly in the propulsion of high-speed aircraft and rockets. Many methods have been suggested for manufacture of this substance. However, no general scheme has yet been proposed for manufacture of this valuable compound from simple basic raw materials.

It is the principal object of this invention to manufacture diborane efficiently and economically from aluminum, hydrogen, ethylene, boric acid, water, ammonia, and sulfuric acid, all of which are cheap, readily available raw materials. Other objects will become apparent on reading the description of the invention that follows.

Briefly, this invention consists, when based on the afore-mentioned raw materials, in the accomplishment of the overall reaction $$2Al + 9H_2 + 6C_2H_4 + 2B(OH)_3 + 2NH_3 + H_2SO_4 \rightarrow$$
$$B_2H_6 + 6C_2H_6 + 2Al(OH)_3 + (NH_4)_2SO_4$$

by means of the following steps:

(a)  $Al(C_2H_5)_3 + B(OR)_3 \rightarrow B(C_2H_5)_3 + Al(OR)_3$
(b)  $B(C_2H_5)_3 + N(R)_3 + 3H_2 \rightarrow H_3B \cdot N(R)_3 + 3C_2H_6$
(c)  $H_3B \cdot N(R)_3 + BF_3 \rightarrow \frac{1}{2}B_2H_6 + F_3B \cdot N(R)_3$
(d)  $Al + 3/2 H_2 + 3C_2H_4 \rightarrow Al(C_2H_5)_3$
(e)  $B(OH)_3 + ROH \rightarrow B(OR)_3 + 3H_2O$
(f)  $Al(OR)_3 + HOH \rightarrow Al(OH)_3 + 3ROH$
(g)  $BF_3 \cdot N(R)_3 + NH_3 \rightarrow BF_3 \cdot NH_3 + N(R)_3$
(h)  $BF_3 \cdot NH_3 + \frac{1}{2}H_2SO_4 \rightarrow BF_3 + (NH_4)_2SO_4$ It will be appreciated that the method of this invention may be operated by purchasing triethylaluminum and eliminating step (d), so that the overall reaction becomes:

$$2Al(C_2H_5)_3 + 3H_2 + B(OH)_3 + 2NH_3 + H_2SO_4 \rightarrow$$
$$B_2H_6 + 6(C_2H_6) + 2Al(OH)_3 + (NH_4)_2CO_4$$

However, this requires maintaining a stock of triethylaluminum on hand. Since a supply of hydrogen is also required because of step (b), this means that inclusion of step (d) requires aluminum as the only additional raw material necessary. The ethane produced in step (b) may be conveniently recycled to the cracking furnace to produce hydrogen and ethylene, as shown in the drawing. Since hydrocarbon cracking provides the most convenient source of hydrogen for the process, operation to produce ethylene simultaneously fits in very well with the entire process scheme. If one includes ethane recycle in the process, the overall reaction may then be written as:

$$2Al + 3H_2 + 2B(OH)_3 + 2NH_3 + H_2SO_4 \rightarrow$$
$$B_2H_6 + 2Al(OH)_3 + (NH_4)_2SO_4$$

and step (i) (cracking furnace 10 in the drawing) will also be included in the overall scheme:

(i)  $C_2H_6 \rightarrow C_2H_4 + H_2$

Suitable and preferred conditions for such a hydrocarbon cracking step are well known in the art and as such are not believed to require explanation. Operation of all the steps (a) through (i) is the preferred method, since better economy of operation and better integration of process steps is achieved in this manner.

The overall manufacturing scheme may be readily understood by reference to the drawing, in which the interrelationship of the steps is clearly shown. It is believed that this diagram is self-explanatory, as all of the steps are plainly labeled and the direction of process flow is indicated by arrows.

The series of steps employed represent an extraordinarily efficient combination of chemical reactions so as to obtain diborane in good yields from the simplest and cheapest of raw materials. Each of these steps is discussed in turn below, specific proportions of reactants and particular reaction conditions being given by way of illustration. Parts given are parts by weight unless otherwise specified.

*Step (a) (reactor 3 in the drawing)*

In a typical procedure there is charged to a stirred reactor 121 parts of triethylaluminum and 100 parts of xylene. Next, 234.6 parts of isobutyl borate are added with stirring. The heat of reaction is sufficient to maintain the desired reaction temperature of approximately 80° C., some cooling being employed if necessary. After the evolution of heat is aparently terminated, the reaction mixture is stirred for approximately one hour. Distillation of the reaction mixture yields approximately 96 parts of triethylborine (approximately 96 percent of theoretical yield).

The use of an aromatic hydrocarbon as a reaction solvent is preferred so as to retain the by-product aluminum alkoxide in solution. If this is not done, a decrease in yield may result due to occlusion of product in the solid alkoxide and incomplete reaction of the starting materials. Since the procedure of this invention has a number of interdependent steps, it is extremely important to obtain the best possible yield in every step. By way of explanation, if one considers, for example, an eight-step process with 90 percent yields in every step, the final yield can easily be slightly less than $(.90)^8$ or only 43 percent.

*Step (b) (reactor 4 in the drawing)*

In a typical procedure there is charged to a stirred high-pressure autoclave 115.1 parts of triethylborine and 118.4 parts of triethylamine. A temperature of approximately 210° C. is maintained, and hydrogen is forced into the vessel at a maximum pressure within the range of about 5,000 to about 5,500 p.s.i.g. These conditions are maintained with agitation for approximately 1 to 1.5 hours, or until sufficient pressure drop is observed to indicate complete reaction. Approximately 133.2 parts of triethylamine borane are obtained, corresponding to a conversion of approximately 99 percent.

Step (c) (reactor 5 in the drawing)

In a reactor equipped with stirrer, condenser with refrigerated receiver, and a nitrogen purging system there are charged 37.46 parts of triethylamine borane. The outlet of the reactor at the top of the condenser is a gas scrubber containing triethylamine which is employed to trap the liberated diborane. A reduced pressure of approximately 200 mm. Hg is applied at the outlet end of the scrubber and 46.61 parts of boron fluoride complex of diethyl ether is added slowly to the reactor over a period of approximately 2 hours, and reaction is continued for approximately 1 more hour, the temperature being maintained during the first 3 hours at about 45 to 50° C. Reaction is continued for approximately 2 more hours at about 80° C., and during the 6th hour the temperature is increased to about 120° C. Approximately 93 to 94 percent of the theoretically available quantity of diborane may be recovered from the contents of the scrubber. Suitable precautions must be taken in handling and storing the diborane product, refrigerated, well-insulated storage facilities being preferred. The diborane produced by this process is stable in storage, being free from impurities which cause this substance to be abnormally sensitive to thermal and mechanical shock.

Step (d) (reactors 1 and 2 in the drawing)

In this step, triethylaluminum is manufactured by the method which has been disclosed by Ziegler and others and which is now operated efficiently on a commercial scale. In the drawing this is illustrated as a two-stage process, involving formation of diethylaluminum hydride in the first stage from triethylaluminum hydrogen, and comminuted aluminum (reactor 1) and formation of triethylaluminum in tie second stage by reaction with ethylene (reactor 2).

Step (e) (reactor 6 in the drawing)

Although trialkyl borates may be obtained in other ways, this step is the method which we prefer. The reaction of boric acid with alcohols may be operated commercially with excellent yields. More specifically, it is preferred to operate continuously with removal of water by distillation of an azeotrope of water with the alcohol or with an added solvent, maintaining the reaction temperature about 30 to 40° C. above the boiling point of the alcohol. When isobutyl alcohol is reacted with boric acid, the preferred reaction temperature is about 150 to 160° C. Water is removed continuously by distillation along with the alcohol, the distillate is separated by gravity, and the alcohol is returned to the reaction vessel. Product mixture is continuously removed and isobutyl borate is recovered by distillation at about 212° C., in a flash evaporator, unreacted boric acid being continuously returned to the reaction vessel.

Step (f) (hydrolysis reactor 7 in the drawing)

Step (f) is the hydrolysis of aluminum alkoxide to produce hydrous alumina and regenerate the alcohol. This reaction is very efficient and is old and well known. A neutral, acid or basic aqueous hydrolysis reagent may be used. It is preferred to hydrolyze the alkoxide continuously, mixing steam with alkoxide in a spray nozzle, continuously removing a distillate of water and alcohol, which is subjected to gravity separation (if the alcohol is only partially soluble in water). After separation, the alcohol may be dried and returned to storage or recycled directly to step (e), as shown in the drawing.

Step (g) (reactor 9 in the drawing)

In a typical process a reaction vessel, equipped with a condenser outlet, a mechanical agitator, and a gas inlet is charged with 81.5 parts of the triethylamine complex of boron fluoride and 133.5 parts of triethylamine. Ammonia gas is admitted through the gas inlet, while the mixture is stirred. The product which is boron fluoride-ammonia complex, is formed as a fine-white crystalline solid in a yield of approximately 41.5 parts, or about 99 percent of theoretical. In the drawing the handling of this solid product by use of a continuous separator is illustrated, although other means, such as a settling tank, could be employed. The high efficiency with which the boron fluoride-ammonia complex is produced makes the regeneration of boron fluoride economically feasible in our process, although some losses of boron fluoride are experienced in step (h). Furthermore, it is upon this novel regeneration system that commercial feasibility of step (c) rests, and therefore the feasibility of the entire process scheme.

Step (h) ($BF_3$ regenerator 8 in the drawing)

The preferred apparatus for carrying out this step is a stirred reactor equipped with a take-off condenser leading to a cold trap and a gas scrubbing apparatus. The reactor is charged with 19.1 parts of boron fluoride-ammonia complex and 23.8 parts of concentrated sulfuric acid. The reaction mixture is heated slowly to approximately 100° C., at which point a large volume of boron fluoride is liberated. Heating is continued until the temperature reaches approximately 275° C. The typical yield of this step is approximately 13 parts of $BF_3$, or about 85 percent of theoretical. The $BF_3$ gas is stored temporarily or fed back immediately into the reaction system, as shown in the drawing.

It will be understood that reaction conditions may be varied somewhat from those described above. In some instances this may involve a sacrifice in yield in order to effect a saving of residence time, energy input, or some other factors. There may also be some variations made in the specific reactants mentioned above. Following are tables showing reactants, conditions, and yields obtained by variations of the principal steps of the process.

Step (a).—Boron alkylations using aluminum triethyl

| Boron compound | Moles B cpd. | Moles $Al(C_2H_5)_3$ | Solvent | Amount solvent in ml. | Temperature, ° C. | Percent yield |
|---|---|---|---|---|---|---|
| $B(OCH_3)_3$ | 0.63 | 0.70 | n-Hexane | 100 | 68 | 56 |
| $B(OCH_3)_3$ | 0.51 | 0.50 | Benzene | 200 | 80 | 51 |
| $B(iso-OC_3H_7)_3$ | 0.81 | 0.84 | Xylene | 207 | 55 | 71 |
| $B(iso-OC_3H_7)_3$ | 1.00 | 1.05 | do | 208 | 85 | 70 |
| $B(iso-OC_3H_7)_3$ | 0.64 | 0.72 | do | 100 | 20 | 66 |
| $B(iso-OC_3H_7)_3$ | 0.81 | 0.84 | do | 100 | 80 | 91 |
| $B(OC_6H_{13})_3$ | 1.35 | 1.65 | do | 100 | 80 | 96 |
| $B(iso-OC_3H_7)_3$ | 2.00 | 2.32 | do | 100 | 80 | 92 |
| $B(iso-OC_3H_7)_3$ | 2.42 | 2.60 | do | 200 | 80 | 94 |
| $B(OC_6H_{13})_3$ | 1.05 | 1.25 | do | 100 | 80 | 98 |
| $B(iso-OC_4H_{10})_3$ | 1.02 | 1.06 | do | 100 | 80 | 98 |
| $B(iso-OC_4H_{10})_3$ | 1.00 | 1.04 | do | 100 | 80 | 95 |

*Step (b).—Boron triethyl reductions*

| Moles B(C₂H₅)₃ | Moles N(C₂H₅)₃ | Initial pressure | P max. | P avg. | Temperature, °F. | Time, hours | Percent yield |
|---|---|---|---|---|---|---|---|
| 0.63 | 0.63 | 1,400 | 2,350 | 2,000 | 390 | 2 | 52 |
| 0.64 | 0.645 | 1,250 | 2,200 | 2,150 | 410 | 1½ | 72 |
| 0.46 | 0.47 | 1,700 | 3,300 | 3,300 | 430 | 2½ | 72 |
| 1.05 | 1.25 | 2,200 | 4,225 | 3,750 | 405 | 3½ | 100 |
| 1.00 | 1.31 | 3,275 | 5,150 | 4,200 | 420 | 4 | 100 |
| 1.09 | 1.28 | 2,700 | 4,250 | 4,100 | 410 | 4 | 97 |
| 0.61 | 0.71 | 2,700 | 4,400 | 4,200 | 420 | 1⅙ | 93 |
| 1.07 | 1.25 | 3,350 | 5,750 | 5,200 | 420 | 1¹¹⁄₁₂ | 100 |
| 0.94 | 1.04 | 2,900 | 4,800 | 4,500 | 410 | ½ | 81 |
| 0.98 | 1.18 | 3,150 | 5,175 | 5,000 | 420 | ⁵⁴⁄₆₀ | 93 |
| 1.00 | 1.05 | 3,125 | 5,175 | -------- | 420 | 1⅛ | 100 |
| 1.16 | 1.17 | 3,075 | 5,175 | 5,000 | 420 | 1¼ | 100 |

*Step (c).—Diborane formation*

| Liberation reagent | Mole scale | Solvent | Temperature, °C. | Pressure, mm. | Percent yield |
|---|---|---|---|---|---|
| BF₃ | 0.140 | n-pentane | 38 | Atm | 99.0 |
| F₃B·O(C₂H₅)₃ | 0.282 | | 80 | Atm | 35.0 |
| F₃B·O(C₂H₅)₃ | 0.330 | | 120 | Atm | 52.0 |
| F₃B·O(C₂H₅)₃ | 0.328 | | (*) | 200 | 93.6 |
| F₃B·O(C₂H₅)₃ | 0.691 | | (*) | 200 | 93.1 |

*The temperature was maintained in the following order: 45–50° C. for 3 hours, 80° C. for 2 hours, and 120° C. for 1 hour.

*Step (e).—Borate ester preparations*

| Borate ester | Moles H₃BO₃ | Moles ROH | Azeotrope-forming solvent | Amount solvent in ml. | Reaction* temperature, °C. | Percent yield |
|---|---|---|---|---|---|---|
| Isopropyl | 2.0 | 10.0 | Benzene | 1,300 | 70 | 95 |
| Do | 2.0 | 10.0 | do | 200 | 70 | 96 |
| Do | 5.0 | 17.5 | do | 500 | 70 | 93 |
| 2-ethyl butyl | 4.0 | 12.5 | Xylene | 200 | 101 | 96 |
| Do | 4.0 | 12.5 | do | 200 | 108 | 96 |
| Isobutyl | 5.0 | 18.4 | Isobutanol | | 101 | 95 |
| Phenyl | 1.0 | 3.2 | Xylene | 100 | 98 | 100 |
| Do | 1.0 | 3.0 | do | 250 | 98 | 100 |
| Isobutyl | 6.5 | 20.0 | Isobutanol | | 101 | 97 |
| Do | 10.0 | 32.0 | do | | 103 | 96 |

*This is the reaction temperature in the vessel at reflux conditions.

*Step (h).—Boron trifluoride regeneration*

| Excess H₂SO₄ over stoichiometric | Maximum temperature, °C. | Percent yield |
|---|---|---|
| 1.0 | 218 | 83.2 |
| 1.0 | 275 | 85.3 |

Tabulated below are suitable and preferred conditions of temperature and pressure under which the steps of the process may be operated.

| Step | Process conditions | | | |
|---|---|---|---|---|
| | Suitable | | Preferred | |
| | Temperature, °C. | Pressure | Temperature, °C. | Pressure |
| (a) | 0–100 | 1 atm | 65–95 | 1 atm. |
| (b) | 150–275 | 1,000–6,000 p.s.i. | 200–250 | 3,000–5,000. p.s.i. |
| (c) | 0–175 | 0.05–15 p.s.i. | 50–120 | 0.3–15 p.s.i. |
| (d) Hydrogenation | 90–180 | H₂ pressure 200–5,000 p.s.i. | 110–145 | H₂ pressure 500–2,500 p.s.i. |
| Ethylation | 65–180 | 100–1,000 p.s.i. | 105–150 | 300–800 p.s.i. |
| (e) | ¹ 50–300 | 1 atm | ¹ 100–250 | 1 atm. |
| (f) | 100–250 | 1 atm. or reduced pressure.² | 100–150 | 1 atm. |
| (g) | −20–90 | 1 atm | 10–50 | 1 atm. |
| (h) | 25–350 | 0.5–15 p.s.i. | 50–275 | 1 atm. |

¹ Dependent upon the vapor pressure of the specific borate ester employed.
² Depending upon whether the hydrous aluminum oxide product is desired as a dry powder, paste or slurry.

In the production of aluminum hydroxide, some losses of alcohol may be tolerated becaust it is cheaper to add make-up alcohol than attempt 100 percent recovery. The same comment applies to the losses of boron fluoride and trialkylamine in the course of production of ammonium sulfate in steps (g) and (h).

It will be understood that the above examples are presented by way of illustration and not by way of limitation. Other variations from the disclosed procedure will naturally occur to those skilled in the art and are to be considered as within the scope of the appended claims.

We claim:

1. The method of manufacturing diborane comprising the steps:
   (a) reacting triethylaluminum with a trialkylborate to produce triethylborine and an aluminum trialkoxide;
   (b) reacting triethylborine of step (a) with a trialkylamine and hydrogen to produce a trialkylamineborane compound and ethane;
   (c) reacting the trialkylamine-borane compound of step (b) with boron fluoride to yield diborane and a trialkylamine-boron fluoride compound;
   (d) reacting comminuted aluminum with hydrogen and ethylene to produce the triethylaluminum employed in step (a);
   (e) reacting boric acid with an alcohol to yield the trialkylborate employed in step (a);
   (f) reacting the aluminum trialkoxide produced in step (a) with water to produce hydrous aluminum oxide and the alcohol employed in step (e);
   (g) reacting the trialkylamine-boron fluoride compound produced in step (c) with ammonia to produce a boron fluoride-ammonia composition and the trialkylamine employed in step (b);
   (h) reacting the boron fluoride-ammonia compositions produced in step (g) with sulfuric acid to produce ammonium sulfate and the boron fluoride employed in step (c) and
(i) subjecting the ethane produced in step (b) to cracking conditions to produce hydrogen and ethylene employed in step (d).

2. The method of manufacturing diborane comprising the steps:
(a) reacting triethylaluminum with a trialkylborate at a temperature of about 0 to 100° C. and a pressure of about 1 atmosphere to produce triethylborine and an aluminum trialkoxide;
(b) reacting triethylborine of step (a) with a trialkylamine and hydrogen at a temperature of about 150 to 275° C. and a hydrogen pressure of about 1000 to 6000 p.s.i. to produce a trialkylamine-borane compound and ethane;
(c) reacting the trialkylamine-borane compound of step (b) with boron fluoride at a temperature of about 0 to 175° C. and a pressure of about 0.05 to 15 p.s.i. to yield diborane and a trialkylamine-boron fluoride compound;
(d) reacting comminuted aluminum with hydrogen and triethylaluminum at a temperature of about 90 to 180° C. and a pressure of about 200 to 5000 p.s.i. to yield diethylaluminum hydride which is then converted to triethylaluminum employed in step (a) by reacting with ethylene at a temperature of about 65 to 180° C. and a pressure of about 100 to 1000 p.s.i.;
(e) reacting boric acid with an alcohol at a temperature of about 50 to 300° C. and a pressure of about 1 atmosphere to yield the trialkylborate employed in step (a);
(f) reacting the aluminum trialkoxide produced in step (a) with water at a temperature of about 100 to 250° C. and at a pressure of about 1 atmosphere to produce hydrous aluminum oxide and the alcohol employed in step (e);
(g) reacting the trialkylamine-boron fluoride compound produced in step (c) with ammonia at a temperature of about minus 20 to 90° C. and a pressure of about 1 atmosphere to produce a boron fluoride-ammonia composition and the trialkylamine employed in step (b);
(h) reacting the boron-fluoride-ammonia composition produced in step (g) with sulfuric acid at a temperature of about 25 to 350° C. and a pressure of about 0.5 to 15 p.s.i. to produce ammonium sulfate and the boron fluoride employed in step (c) and
(i) subjecting the ethane produced in step (b) to cracking conditions to produce hydrogen and ethylene employed in step (d).

3. The method of manufacturing diborane comprising the steps:
(a) reacting triethylaluminum with a trialkylborate at a temperature of about 65 to 95° C. and a pressure of about 1 atmosphere to produce triethylborine and an aluminum trialkoxide;
(b) reacting triethylborine of step (a) with a trialkylamine and hydrogen at a temperature of about 200 to 250° C. and a hydrogen pressure of about 3000 to 5000 p.s.i. to produce a trialkylamine-borane compound and ethane;
(c) reacting the trialkylamine-borane compound of step (b) with boron fluoride at a temperature of about 50 to 120° C. and a pressure of about 0.3 to 15 p.s.i. to yield diborane and a trialkylamine-boron fluoride compound;
(d) reacting comminuted aluminum with hydrogen and triethylaluminum at a temperature of about 110 to 145° C. and a pressure of about 500 to 2500 p.s.i. to yield diethylaluminum hydride which is then converted to triethylaluminum employed in step (a) by reacting with ethylene at a temperature of about 105 to 150° C. and a pressure of about 300 to 800 p.s.i.;

(e) reacting boric acid with an alcohol at a temperature of about 100 to 250° C. and a pressure of about 1 atmosphere to yield the trialkylborate employed in step (a);
(f) reacting the aluminum trialkoxide produced in step (a) with water at a temperature of about 100 to 150° C. and at a pressure of about 1 atmosphere to produce hydrous aluminum oxide and the alcohol employed in step (e);
(g) reacting the trialkylamine-boron fluoride compound produced in step (c) with ammonia at a temperature of about 10 to 50° C. and a pressure of about 1 atmosphere to produce a boron fluoride-ammonia composition and the trialkylamine employed in step (b);
(h) reacting the boron-fluoride-ammonia composition produced in step (g) with sulfuric acid at a temperature of about 50 to 275° C. and a pressure of about 1 atmosphere to produce ammonium sulfate and the boron fluoride employed in step (c) and
(i) subjecting the ethane produced in step (b) to cracking conditions to produce hydrogen and ethylene employed in step (d).

4. The method of manufacturing diborane comprising the steps:
(a) reacting triethylaluminum with a triisobutylborate at a temperature of about 0 to 100° C. and a pressure of about 1 atmosphere to produce triethylborine and aluminum triisobutoxide;
(b) reacting triethylborine of step (a) with triethylamine and hydrogen at a temperature of about 150 to 275° C. and a hydrogen pressure of about 1000 to 6000 p.s.i. to produce a triethylamine-borane compound and ethane;
(c) reacting the triethylamine-borane compound of step (b) with boron fluoride at a temperature of about 0 to 175° C. and a pressure of about 0.05 to 15 p.s.i. to yield diborane and a triethylamine-boron fluoride compound;
(d) reacting comminuted aluminum with hydrogen and triethylaluminum at a temperature of about 90 to 180° C. and a pressure of about 200 to 5000 p.s.i. to yield diethylaluminum hydride which is then converted to triethylaluminum employed in step (a) by reacting with ethylene at a temperature of about 65 to 180° C. and a pressure of about 100 to 1000 p.s.i.;
(e) reacting boric acid with isobutyl alcohol at a temperature of about 50 to 300° C. and a pressure of about 1 atmosphere to yield the triisobutylborate employed in step (a);
(f) reacting the aluminum triisobutoxide produced in step (a) with water at a temperature of about 100 to 250° C. and at a pressure of about 1 atmosphere to produce hydrous almuinum oxide and the isobutyl alcohol employed in step (e);
(g) reacting the triethylamine-boron fluoride compound produced in step (c) with ammonia at a temperature of about minus 20 to 90° C. and a pressure of about 1 atmosphere to produce a boron fluoride-ammonia composition and the triethylamine employed in step (b);
(h) reacting the boron-fluoride-ammonia composition produced in step (g) with sulfuric acid at a temperature of about 25 to 350° C. and a pressure of about 0.5 to 15 p.s.i. to produce ammonium sulfate and the boron fluoride employed in step (c) and
(i) subjecting the ethane produced in step (b) to cracking conditions to produce hydrogen and ethylene employed in step (d).

5. The method of manufacturing diborane comprising the steps:
(a) reacting triethylaluminum with a triisobutylborate at a temperature of about 65 to 95° C. and a pressure of about 1 atmosphere to produce triethylborine and an aluminum triisobutoxide;
(b) reacting triethylborine of step (a) with a triethylamine and hydrogen at a temperature of about 200 to 250° C. and a hydrogen pressure of about 3000 to 5000 p.s.i. to produce a triethylamine-borane compound and ethane;
(c) reacting the triethylamine-borane compound of step (b) with boron fluoride at a temperature of about 50 to 120° C. and a pressure of about 0.3 to 15 p.s.i. to yield diborane and a triethylamine-boron fluoride compound;
(d) reacting comminuted aluminum with hydrogen and triethylaluminum at a temperature of about 110 to 145° C. and a pressure of about 500 to 2500 p.s.i. to yield diethylaluminum hydride which is then converted to triethylaluminum employed in step (a) by reacting with ethylene at a temperature of about 105 to 150° C. and a pressure of about 300 to 800 p.s.i.;
(e) reacting boric acid with isobutyl alcohol at a temperature of about 100 to 250° C. and a pressure of about 1 atmosphere to yield the triisobutylborate employed in step (a);
(f) reacting the aluminum triisobutoxide produced in step (a) with water at a temperature of about 100 to 150° C. and at a pressure of about 1 atmosphere to produce hydrous aluminum oxide and the isobutyl alcohol employed in step (e);
(g) reacting the triethylamine-boron fluoride compound produced in step (c) with ammonia at a temperautre of about 10 to 50° C. and a pressure of about 1 atmosphere to produce a boron fluoride-ammonia composition and the triethylamine employed in step (b);
(h) reacting the boron-fluoride-ammonia composition produced in step (g) with sulfuric acid at a temperature of about 50 to 275° C. and a pressure of about 1 atmosphere to produce ammonium sulfate and the boron fluoride employed in step (c) and
(i) subjecting the ethane produced in step (b) to cracking conditions to produce hydrogen and ethylene employed in step (d).

6. The method of manufacturing diborane comprising the steps:
(a) reacting triethylaluminum with a trialkylborate to produce triethylborine and an aluminum trialkoxide;
(b) reacting triethylborine of step (a) with a trialkylamine and hydrogen to produce a trialkylamine-borane compound and ethane;
(c) reacting the trialkylamine-borane compound of step (b) with boron fluoride to yield diborane and a trialkylamine-boron fluoride compound;
(d) reacting comminuted aluminum with hydrogen and ethylene to produce the triethylaluminum employed in step (a);
(e) reacting boric acid with an alcohol to yield the trialkylborate employed in step (a);
(f) reacting the aluminum trialkoxide produced in step (a) with water to produce hydrous aluminum oxide and the alcohol employed in step (e);
(g) reacting the trialkylamine-boron fluoride compound produced in step (c) with ammonia to produce a boron fluoride-ammonia composition and the trialkylamine employed in step (b);
(h) reacting the boron fluoride-ammonia composition produced in step (g) with sulfuric acid to produce ammonium sulfate and the boron fluoride employed in step (c).

7. The method of manufacturing diborane comprising the steps:
(a) reacting triethylaluminum with a trialkylborate at a temperature of about 0 to 100° C. and a pressure of about 1 atmosphere to produce triethylborine and an aluminum trialkoxide;
(b) reacting triethylborine of step (a) with a trialkylamine and hydrogen at a temperature of about 150 to 275° C. and a hydrogen pressure of about 1000 to 6000 p.s.i. to produce a trialkylamine-borane compound and ethane;
(c) reacting the trialkylamine-borane compound of step (b) with boron fluoride at a temperature of about 0 to 175° C. and a pressure of about 0.05 to 15 p.s.i. to yield diborane and a trialkylamine-boron fluoride compound;
(d) reacting comminuted aluminum with hydrogen and triethylaluminum at a temperature of about 90 to 180° C. and a pressure of about 200 to 5000 p.s.i. to yield diethylaluminum hydride which is then converted to triethylaluminum employed in step (a) by reacting with ethylene at a temperature of about 65 to 180° C. and a pressure of about 100 to 1000 p.s.i.;
(e) reacting boric acid with an alcohol at a temperature of about 50 to 300° C. and a pressure of about 1 atmosphere to yield the trialkylborate employed in step (a);
(f) reacting the aluminum trialkoxide produced in step (a) with water at a temperature of about 100 to 250° C. and at a pressure of about 1 atmosphere to produce hydrous aluminum oxide and the alcohol employed in step (e);
(g) reacting the trialkylamine-boron fluoride compound produced in step (c) with ammonia at a temperature of about minus 20 to 90° C. and a pressure of about 1 atmosphere to produce a boron fluoride-ammonia composition and the trialkylamine employed in step (b);
(h) reacting the boron-fluoride-ammonia compositions produced in step (g) with sulfuric acid at a temperature of about 25 to 350° C. and a pressure of about 0.5 to 15 p.s.i. to produce ammonium sulfate and the boron fluoride employed in step (c);

8. The method of manufacturing diborane comprising the steps:
(a) reacting triethylaluminum with a trialkylborate at a temperature of about 65 to 95° C. and a pressure of about 1 atmosphere to produce triethylborine and an aluminum trialkoxide;
(b) reacting triethylborine of step (a) with a trialkylamine and hydrogen at a temperature of about 200 to 250° C. and a hydrogen pressure of about 3000 to 5000 p.s.i. to produce a trialkylamine-borane compound and ethane;
(c) reacting the trialkylamine-borane compound of step (b) with boron fluoride at a temperature of about 50 to 120° C. and a pressure of about 0.3 to 15 p.s.i. to yield diborane and a trialkylamine-boron fluoride compound;
(d) reacting comminuted aluminum with hydrogen and triethylaluminum at a temperature of about 110 to 145° C. and a pressure of about 500 to 2500 p.s.i. to yield diethylaluminum hydride which is then converted to triethylaluminum employed in step (a) by reacting with ethylene at a temperature of about 105 to 150° C. and a pressure of about 300 to 800 p.s.i.;
(e) reacting boric acid with an alcohol at a temperature of about 100 to 250° C. and a pressure of about 1 atmosphere to yield the trialkylborate employed in step (a);
(f) reacting the aluminum trialkoxide produced in step (a) with water at a temperature of about 100 to 150° C. and at a pressure of about 1 atmosphere to produce hydrous aluminum oxide and the alcohol employed in step (e);
(g) reacting the trialkylamine-boron fluoride compound produced in step (c) with ammonia at a temperature of about 10 to 50° C. and a pressure of about 1 atmosphere to produce a boron fluoride-ammonia composition and the trialkylamine employed in step (b);
(h) reacting the boron-fluoride-ammonia composition produced in step (g) with sulfuric acid at a temperature of about 50 to 275° C. and a pressure of about 1 atmosphere to produce ammonium sulfate and the boron fluoride employed in step (c).

9. The method of manufacturing diborane comprising the steps:
(a) reacting triethylaluminum with a trialkylborate to produce triethylborine and an aluminum trialkoxide;
(b) reacting triethylborine of step (a) with a trialkylamine and hydrogen to produce a trialkylamine-borane compound and ethane;
(c) reacting the trialkylamine-borane compound of step (b) with boron fluoride to yield diborane and a trialkylamine-boron fluoride compound;
(e) reacting boric acid with an alcohol to yield the trialkylborate employed in step (a);
(f) reacting the aluminum trialkoxide produced in step (a) with water to produce hydrous aluminum oxide and the alcohol employed in step (e);
(g) reacting the trialkylamine-boron fluoride compound produced in step (c) with ammonia to produce a boron fluoride-ammonia composition and the trialkylamine employed in step (b);
(h) reacting the boron fluoride-ammonia composition produced in step (g) with sulfuric acid to produce ammonia sulfate and the boron fluoride employed in step (c).

10. The method of manufacturing diborane comprising the steps:
(a) reacting triethylaluminum with a trialkylborate at a temperature of about 0 to 100° C. and a pressure of about 1 atmosphere to produce triethylborine and an aluminum trialkoxide;
(b) reacting triethylborine of step (a) with a trialkylamine and hydrogen at a temperature of about 150 to 275° C. and a hydrogen pressure of about 1000 to 6000 p.s.i. to produce a trialkylamine-borane compound and ethane;
(c) reacting the trialkylamine-borane compound of step (b) with boron fluoride at a temperature of about 0 to 175° C. and a pressure of about 0.05 to 15 p.s.i. to yield diborane and a trialkylamine-boron fluoride compound;
(e) reacting boric acid with an alcohol at a temperature of about 50 to 300° C. and a pressure of about 1 atmosphere to yield the trialkylborate employed in step (a);
(f) reacting the aluminum trialkoxide produced in step (a) with water at a temperature of about 100 to 250° C. and at a pressure of about 1 atmosphere to produce hydrous aluminum oxide and the alcohol employed in step (e);
(g) reacting the trialkylamine-boron fluoride compound produced in step (c) with ammonia at a temperature of about minus 20 to 90° C. and a pressure of about 1 atmosphere to produce a boron fluoride-ammonia composition and the trialkylamine employed in step (b);
(h) reacting the boron-fluoride-ammonia composition produced in step (g) with sulfuric acid at a temperature of about 25 to 350° C. and a pressure of about 0.5 to 15 p.s.i. to produce ammonium sulfate and the boron fluoride employed in step (c).

11. The method of manufacturing diborane comprising the steps:
(a) reacting triethylaluminum with a trialkylborate at a temperature of about 65 to 95° C. and a pressure of about 1 atmosphere to produce triethylborine and an aluminum trialkoxide;
(b) reacting triethylborine of step (a) with a trialkylamine and hydrogen at a temperature of about 200 to 250° C. and a hydrogen pressure of about 3000 to 5000 p.s.i. to produce a trialkylamine-borane compound and ethane;
(c) reacting the trialkylamine-borane compound of step (b) with boron fluoride at a temperature of about 50 to 120° C. and a pressure of about 0.3 to 15 p.s.i. to yield diborane and a trialkylamine-boron fluoride compound;
(e) reacting boric acid with an alcohol at a temperature of about 100 to 250° C. and a pressure of about 1 atmosphere to yield the trialkylborate employed in step (a);
(f) reacting the aluminum trialkoxide produced in step (a) with water at a temperature of about 100 to 150° C. and at a pressure of about 1 atmosphere to produce hydrous aluminum oxide and the alcohol employed in step (e);
(g) reacting the trialkylamine-boron fluoride compound produced in step (c) with ammonia at a temperature of about 10 to 50° C. and a pressure of about 1 atmosphere to produce a boron fluoride-ammonia composition and the trialkylamine employed in step (b);
(h) reacting the boron-fluoride-ammonia composition produced in step (g) with sulfuric acid at a temperature of about 50 to 275° C. and a pressure of about 1 atmosphere to produce ammonium sulfate and the boron fluoride employed in step (c).

12. In a method of manufacturing diborane in which a trialkylamine-borane compound is reacted with boron fluoride to yield diborane and a trialkylamine-boron fluoride compound, the improvement consisting of regeneration of boron fluoride by means of the steps of reacting said trialkylamine-boron fluoride compound with ammonia to yield a trialkylamine and boron-fluoride-ammonia composition and reaction of said boron fluoride-ammonia composition with an acid to produce boron fluoride .

13. The improvement according to claim 12 in which the trialkylamine is triethylamine and the acid is sulfuric acid.

14. The improvement according to claim 12 in which the boron fluoride produced by reacting said boron-fluoride ammonia composition with acid is recycled to the process step in which boron fluoride is reacted with a trialkylamine-boron compound.

No references cited.

MAURICE A. BRINDISI, *Primary Examiner.*
ROGER L. CAMPBELL, *Examiner.*